(12) United States Patent
Mason

(10) Patent No.: US 12,419,278 B1
(45) Date of Patent: Sep. 23, 2025

(54) EXTENDING PET EXCREMENT COLLECTOR DEVICE

(71) Applicant: Tyrone Mason, Philadelphia, PA (US)

(72) Inventor: Tyrone Mason, Philadelphia, PA (US)

( * ) Notice: Subject to any disclaimer, the term of this patent is extended or adjusted under 35 U.S.C. 154(b) by 406 days.

(21) Appl. No.: 17/970,234

(22) Filed: Oct. 20, 2022

(51) Int. Cl.
*E01H 1/12* (2006.01)
*A01K 23/00* (2006.01)

(52) U.S. Cl.
CPC .................... *A01K 23/005* (2013.01)

(58) Field of Classification Search
CPC ... A01K 23/005; A01K 1/0014; E01H 1/1206
USPC .................................... 294/1.4, 1.5
See application file for complete search history.

(56) References Cited

U.S. PATENT DOCUMENTS

| | | | | |
|---|---|---|---|---|
| 3,804,448 A * | 4/1974 | Schmieler | ............. | E01H 1/1206 |
| | | | | D30/162 |
| 4,042,269 A * | 8/1977 | Skermetta | ............. | E01H 1/1206 |
| | | | | 15/257.3 |
| 5,080,681 A * | 1/1992 | Erb | .......... | A61F 2/583 |
| | | | | 294/902 |
| 6,371,686 B1 * | 4/2002 | Wu | .......... | F16B 7/105 |
| | | | | 135/25.1 |
| 7,631,910 B2 * | 12/2009 | Shalhoub | ............ | A01K 23/005 |
| | | | | 294/1.5 |
| 9,382,679 B2 * | 7/2016 | Bevans | ................ | E01H 1/1206 |
| 9,420,762 B2 * | 8/2016 | Brasuel | ............... | A01K 23/005 |
| 9,957,678 B2 | 5/2018 | Rooney | | |
| 10,405,523 B1 * | 9/2019 | Cooke | .................. | A01K 23/005 |
| 10,465,351 B1 * | 11/2019 | Perez | .................... | E01H 1/1206 |
| 10,655,289 B1 | 5/2020 | Kelly et al. | | |
| 11,096,377 B1 * | 8/2021 | Rogers | ..................... | B25G 1/04 |
| 2007/0046045 A1 * | 3/2007 | Yilmaz | ................ | A01K 23/005 |
| | | | | 294/1.4 |
| 2011/0057463 A1 * | 3/2011 | Chen | .................... | A01K 23/005 |
| | | | | 294/1.4 |

* cited by examiner

*Primary Examiner* — Paul T Chin
(74) *Attorney, Agent, or Firm* — Sanchelima & Associates, P.A.; Jesus Sanchelima; Christian Sanchelima

(57) ABSTRACT

An extending pet excrement collector device including a telescoping assembly, a support assembly and a lighting assembly. The telescoping assembly includes a handle grip. The telescoping assembly includes a telescopic rod. The telescopic rod has a plurality of rods and a plurality of interlock sections. The telescopic rod can extend and retract using the plurality of rods telescopically connected, the telescopic rod can be folded using the plurality of interlock sections placed at the ends of the rods. The support assembly includes a coupling end and a bag. The coupling end is capable of configuring and maintaining the angle of the support assembly. The bag surrounds the support assembly to collect the feces pet. The lighting assembly includes a housing, a light emitter and a button. The light emitter is turned on and turned off by the configuration of the button to light up a darkened area.

5 Claims, 4 Drawing Sheets

EXTENDING PET EXCREMENT COLLECTOR DEVICE

BACKGROUND OF THE INVENTION

1. Field of the Invention

The present invention relates to a pet excrement collector device and, more particularly, to an extending pet excrement collector device that includes an extending handle.

2. Description of the Related Art

Several designs for pet excrement collector devices have been designed in the past. None of them, however, include a telescopic rod that can be extended with a support at the end where a bag can be attached. The telescopic rod when extended can be folded in a predetermined configuration to slide along the ground and under the pet to collect the feces of the pet eliminating the need to bend over and enhancing sanitation. The telescopic rod includes a light emitter to light up a darkened area during nighttime walks.

Applicant believes that a related reference corresponds to U.S. Pat. No. 10,655,289 issued for a pet waste collection device with a handle, telescopic pole, and a frame assembly that can support a waste collection bag. Applicant believes that another related reference is U.S. Pat. No. 9,957,678 issued for feces catching apparatus with a telescopic handle and a collection vessel. None of these references, however, teach of an extending pet excrement collector device that comprises a handle grip connected to a foldable pole assembly, attached to a support assembly to hold a waste collection bag and may also contain a light device.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide an extending and foldable pet excrement collector device that provides an effective way to capture and collect pet dog waste.

It is another object of this invention to eliminate the need to bend over and collect the waste from ground surfaces.

It is still another object of the present invention to enhance sanitation, reduces messes and physical strain, portable and light weight.

It is yet another object of this invention to provide a lighting assembly adapted to the handle grip which lights up through the length of the telescopic rod to the support assembly to collect the pet excrement when there is not enough environmental light.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
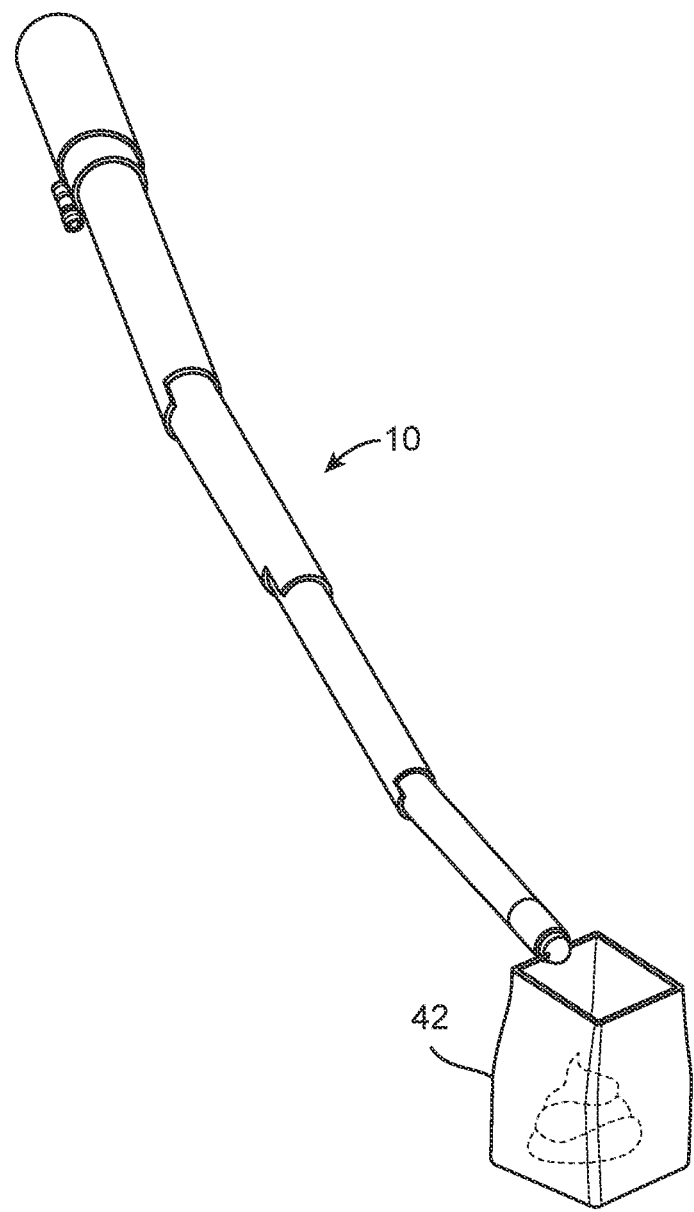
FIG. 1 represents an isometric operational view of the present invention 10. The telescoping assembly 20 is extended. 60 The lighting assembly and the support assembly 40.
Figure 2:
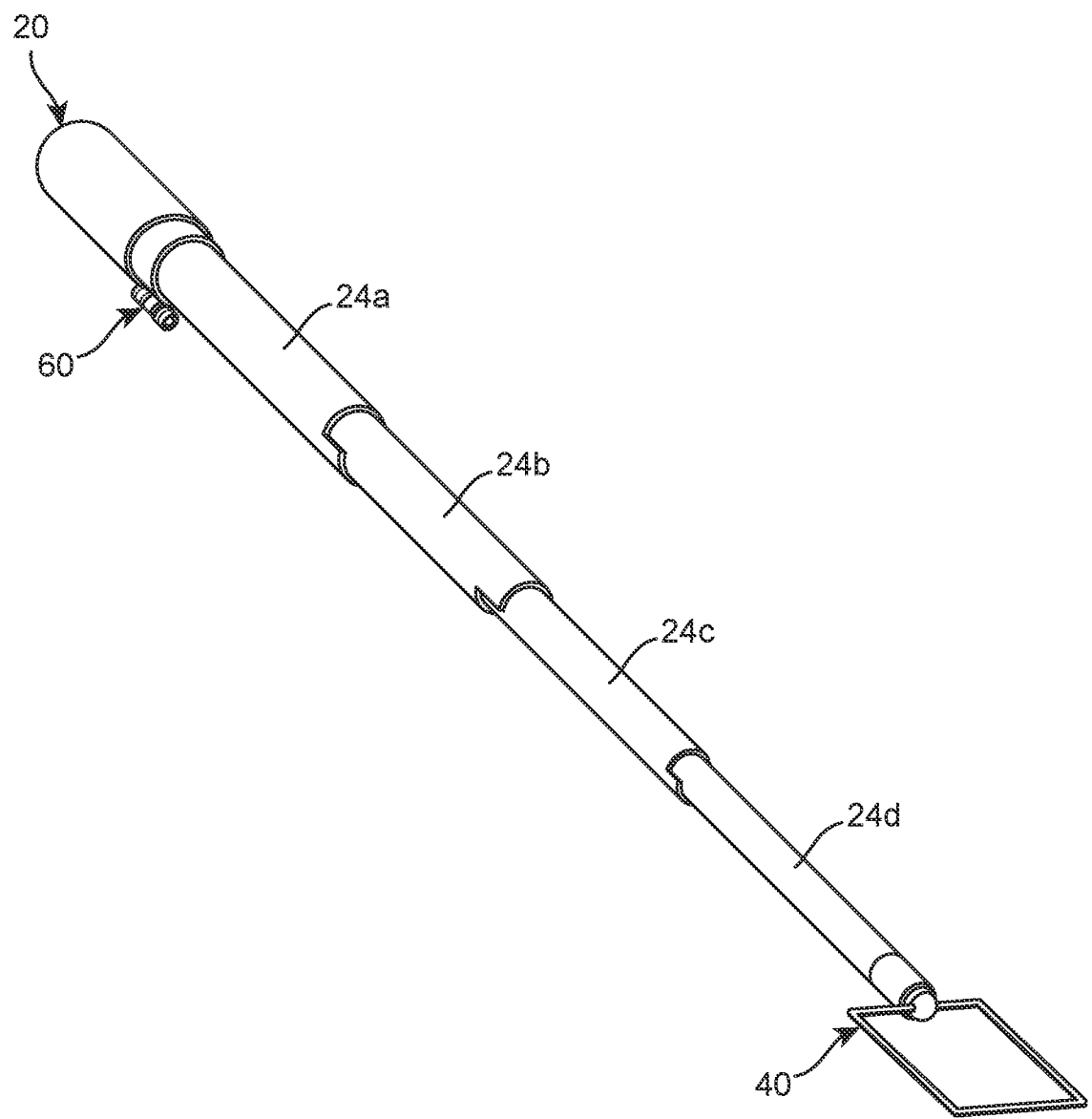
FIG. 2 illustrates a perspective view of the support assembly 40 attached to the telescoping assembly 20 wherein the telescoping assembly 20 is in extended configuration.
Figure 3:
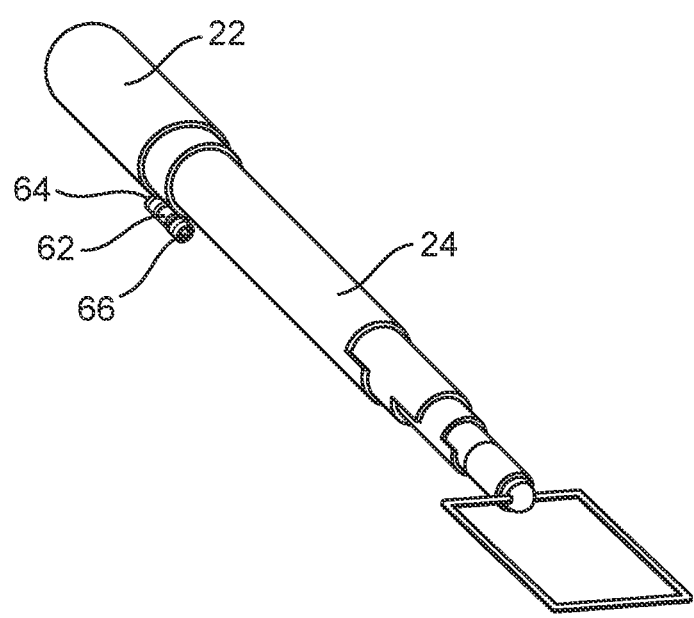
FIG. 3 shows an isometric view of the lighting assembly 60 mounted on the handle grip 22 of the present invention 10 in a contracted configuration.
Figure 4:
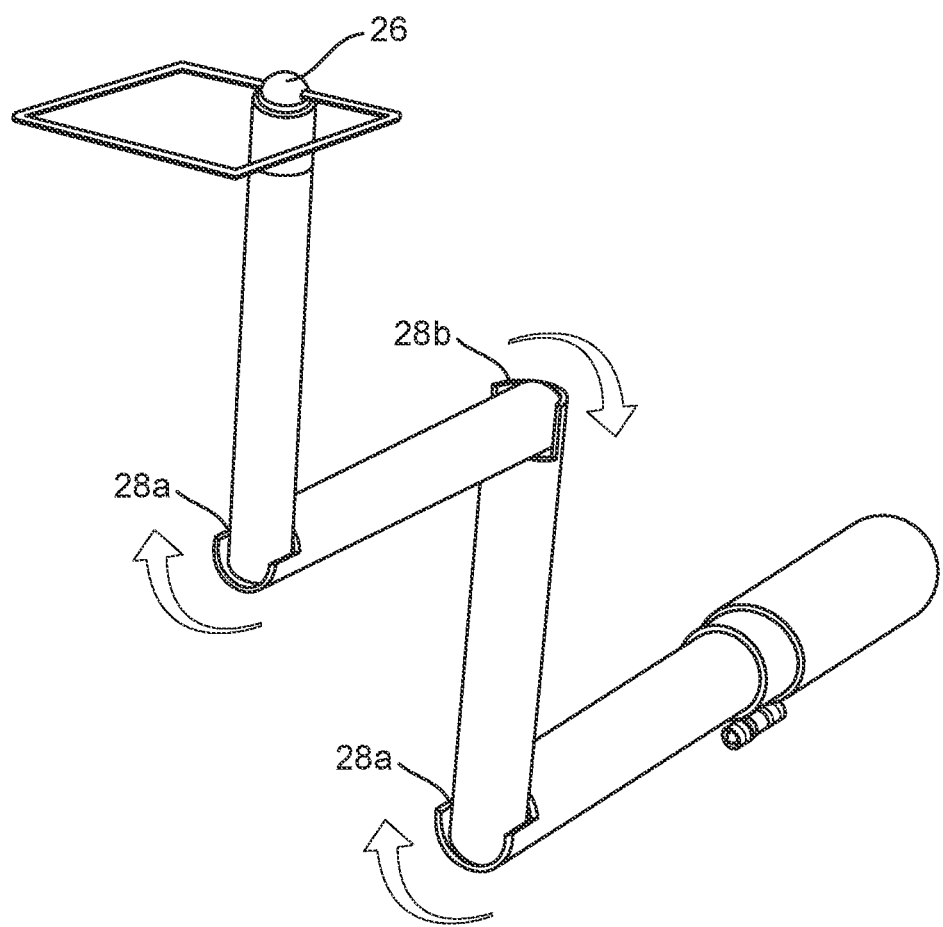
FIG. 4 illustrates a foldable configuration of the telescoping assembly 20. The telescoping 20 assembly includes a telescopic rod 24 that can be adjusted based on operating requirement.

Referring now to the drawings, where the present invention is generally referred to with numeral 10, it can be observed that it basically includes a telescoping assembly 20, a support assembly 40 and a lighting assembly 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

In one embodiment, the telescoping assembly 20 compromises a handle grip 22 with preferably molded plastic, cover foam, or any other strong and durable material in a cylindrical shape, rectangular shape, irregular shape, ergonomic shape or any other suitable shape. The size of the handle grip 22 may be volumetrically suitable to be handheld and preferably long enough to install a lighting assembly 60 within the handle grip 22 or to be coupled to the handle grip 22

In a preferred embodiment, the lighting assembly 60 installed or coupled to the handle grip 22 to emit light outwardly from the handle grip 22 for illuminating a darkened area. The lighting assembly 60 compromises a light emitter 66 positioned in such a way inside a housing 62 that the light emitter 66 directs light along the telescoping assembly 20 to illuminate when the pet defecates on the ground. A button 64 is coupled to the housing 62 and the button 64 is electrically coupled to an electronic circuit that is powered by a battery (not shown in the drawings, but widely known in the art). The button 64 turns the light emitter 66 on and off whenever the user may consider appropriate.

In a suitable exemplary embodiment, the telescoping assembly 20 comprises a telescopic rod 24 to permit extend and retract the present invention in the exemplary embodiment herein discussed. The telescoping rod 24 may include interlock sections 28 that permits the telescopic rod 24 to be folded. In an exemplary embodiment, the present invention may include four rods 24a, 24b, 24c, 24d, 3 interlock section 28a, 28b, 28c, nonetheless, the exemplary embodiment may include more or less than four rods and more and less than three interlock sections that may be case dependent. Preferably the telescopic rod 24 comprises a set of hollow rods 24a, 24b, 24c, 24d of decreasing size placed one inside another. The first rod 24a is coupled within the handle grip 22 at a proximal end thereof. The second rod 24b with a significantly reduced perimeter to be placed inside of the first rod 24a with a coefficient of friction low enough to permit the movement of part sliding out from another. The third rod 24c with a significantly reduced perimeter to be placed inside of the second rod 24b with a coefficient of friction low enough to permit the movement of part sliding out from another. The fourth rod 24d with a significantly reduced perimeter to be placed inside of the second rod 24c with a coefficient of friction low enough to permit the movement of part sliding out from another, thus, lengthening the telescopic rod 24. In an exemplary embodiment, when the telescopic rod 24 extended to its full length has a first interlock section 28a that is placed at the distal end of the first rod 24a and at the proximal end of the second rod 24b to create a link therebetween providing a foldable angle with respect to the first rod 24a longitudinal axis, wherein said angle may be from 0 to 90 (counterclockwise) in accordance to the first rod 24a longitudinal axis or until the second rod 24b collisions with the first rod 24a, a second interlock section 28b is placed at the distal end of the second rod 24b and at the proximal end of the third telescoping section 24c to link the second rod 24b with the third rod 24c providing a foldable angle with respect to the second rod 24b longitudinal axis, this angle may have an angle degree from 180 to 90 (clockwise) in accordance to the second rod 24b longitudinal axis or until the third rod 24c collisions with the second rod 24b, a third interlock section 28c is placed at the distal end of the third rod 24c and at the proximal end of the fourth rod 24d to link the third rod 24c with the fourth rod 24d providing a foldable angle with respect to the third rod 24c longitudinal axis, this angle may have an angle degree from 0 to 90 (counterclockwise) in accordance to the third rod 24c longitudinal axis or until the fourth rod 24d collisions with the third rod 24c.

In a preferred embodiment, the support assembly 40 may be placed at the end of the distal end of the telescoping assembly 20 opposite to the handle grip 22. The support assembly 40 in various embodiments may present a rectangular shape, oval shape, circular shape, regular or irregular shape and/or any variation thereof. The support assembly 40 may be connected by a coupling end 26, such as a hinge base or any other mechanism known in the art, preferably with a coefficient of friction high enough to adjust the support assembly 40 in a variable angle and maintain the angle while carrying the weight of the pet excrement. In a suitable exemplary embodiment, a bag 42 is attached to the perimeter of the support assembly 40 and may be retained by clips or other mechanisms of the prior art. The material of bag 42 can be plastic or any other suitable polymer known in the art.

The present invention 10 in its various embodiments presents a suitable device that slides along the ground to be under the pet before the feces is dropped, therefore the feces drop into the bag 42 and is prevented from touching the ground, enhancing sanitation and convenience eliminating the need to bend over and collect the feces of the animal from the ground The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An extending pet excrement collector device comprising:
    a) a telescoping assembly including a telescopic rod and a handle grip, wherein said telescopic rod has a plurality of rods, said rods are connected one to each other, wherein said telescopic rod is capable of being foldable or extended, said handle grip is coupled to a proximal end of at least of the plurality of rods;
    b) a support assembly coupled to the telescoping assembly at a distal end opposite to the handle grip, said support assembly is configured to collect pet excrement;
    c) a lighting assembly including at least one light emitter disposed on said handle grip, wherein said plurality of telescoping rods are interconnected by a plurality of interlock sections; and
    d) wherein said plurality of rods are capable of being folded one respect to the others by means of said plurality of interlock sections, wherein said interlock sections are located at the junction between adjacent rods and provide a foldable angle with respect to the longitudinal axis of said rods while maintaining the structural connection between the rods.

2. The extending pet excrement collector device of claim 1, said support assembly is attached to said telescoping assembly by means of a coupling end or any other mechanism known in the art.

3. The extending pet excrement collector device of claim 2, wherein said support assembly is capable of be adjusted in a predetermined angle with respect to said telescoping assembly by means of said coupling end.

4. The extending pet excrement collector device of claim 1, wherein said at least one light emitter lights up through the length of said telescoping assembly to the support assembly.

5. The extending pet excrement collector device of claim 4, said light emitter is configured to be turned off/on by means of a button, said button is operatively connected to said lighting assembly.

* * * * *